E. H. PECKINPAUGH.
ARTIFICIAL FISHING BAIT.
APPLICATION FILED NOV. 30, 1921.

1,435,177.

Patented Nov. 14, 1922.

WITNESSES.
Frank B. Cool
Howard D. Orr

INVENTOR,
E. H. Peckinpaugh,
BY C. G. Giggers
ATTORNEY.

Patented Nov. 14, 1922.

1,435,177

UNITED STATES PATENT OFFICE.

ERNEST HILARY PECKINPAUGH, OF CHATTANOOGA, TENNESSEE.

ARTIFICIAL FISHING BAIT.

Application filed November 30, 1921. Serial No. 518,868.

*To all whom it may concern:*

Be it known that I, ERNEST HILARY PECKINPAUGH, a citizen of the United States, residing at Chattanooga, in the county of Hamilton and State of Tennessee, have invented new and useful Improvements in Artificial Fishing Bait, of which the following is a specification.

This invention relates to artificial fishing bait and especially to that class known as flies or lures.

The object is to improve the construction of such artificial flies or lures by the provision of a metallic reinforcing means which engages the eye of the fishing hook, ordinarily passing longitudinally through the body of the fly or lure, which may be in the form of a bug or beetle or other insect, etc., the said reinforcing means being connected to the said body in a manner to prevent the rotation thereof upon the shank of the hook, and extending backwardly along the under side of the body so as to strengthen the same.

Another object is to provide such reinforcing means in the form of a longitudinally disposed plate secured to the body of the lure and having means, where attached at the rear to the said body, for holding resilient weed guards in flanking relation to the point of the fish hook, and adapted to prevent the latter from coming foul of weeds and at the same time permitting the hook to perform its function.

A full and complete understanding of the invention may be obtained from a consideration of the following detailed description taken in connection with the accompanying drawing forming a part of this specification, it being understood that while the drawing shows a practical form of the invention, the latter is not confined to strict conformity therewith, but may be changed or modified so long as such changes or modifications mark no material departure from the salient features of the invention, as specifically pointed out in the appended claims.

In the drawing, in which similar reference characters designate corresponding parts throughout the several figures.

The improved reinforcing means may be readily applied to any of the ordinary fishing devices of this character, such as flies, bugs or beetles having bodies made of cork, silk hair, rubber or other material, and may be readily formed by stamping from thin sheet metal, its application to the body of the lure not requiring any special form of hook or other fastening means, and it has a certain amount of flexibility that permits a slight turning movement when subjected to extraordinary strain, without injury to the component parts of the lure, as would occur were a device used that is brazed, soldered or otherwise rigidly secured to the hook. A special advantage of the reinforcement lies in the fact that the same may be readily applied to the body of the lure during the process of manufacture, or may be secured to such devices already on the market.

Figure 1:
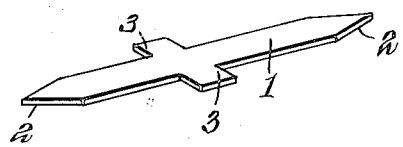
Figure 1 is a perspective view of a sheet metal blank used in the construction of the improved reinforcing means.
Figure 2:
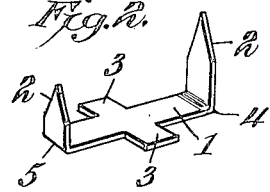
Fig. 2 is a similar view of the same blank after being bent for application to the body of the fly or lure.

The invention comprises an elongated, flat, thin blank 1, formed of suitable, non-corrosive, sheet metal which may be stamped or cut out at one operation to form such blank, which is relatively narrow and provided at each end with beveled sides to form points 2. At a point somewhat nearer to one end than the other, the blank is provided at each side edge with oppositely disposed arms or enlargements 3 and, as shown in Figure 2 of the drawing, the long end of the blank is bent substantially at right-angles, at a point substantially midway of its length, as indicated at 4, while the shorter end of the blank is similarly bent as at 5, at a point nearer to the terminal point 2 thereof, each perpendicularly disposed terminal extending in the same direction, and such blank constitutes the simplest form of the invention.

Figure 3:
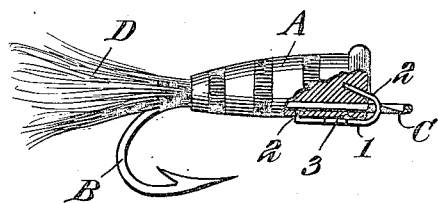
Fig. 3 is a side elevation of a fly or lure, partly broken away, and showing the reinforcement applied thereto.

The application of this form of blank or reinforcement is illustrated in Figure 3, wherein the body A of the lure or fly, which may be of any desired shape or form, painted or marked in simulation of an insect, etc., is provided with a hook B extending longitudinally therethrough, the shank of the same terminating at the front or head end of the body in an eye C, and the active portion of the hook located beneath the rear end of the body, which also carries a bunch D of bucktail or other hairs commonly used in the construction of such devices. The long end of the blank is inserted through the eye C of the hook from below, and the point 2 thereof is driven or otherwise embedded in the front end of the body A of the lure, the shorter end passing along beneath the body of the lure and having its point 2 driven into the lower face of the same at some distance back from the head thereof. The side arms or enlargements 3 are bent or curved to fit the body and present a wide bearing surface which, in conjunction with the terminal points being anchored in the body, effectively prevent any relative movement of the parts, and the body is prevented from rotation upon the shank of the hook by reason of the interlocking engagement of the front end of the blank with the eye of the hook.

Figure 4:
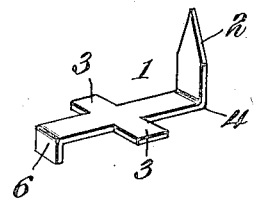
Fig. 4 is a perspective view of a slightly modified form of the invention.
Figure 5:
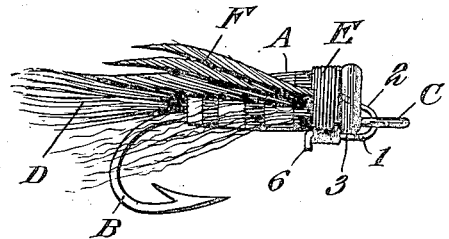
Fig. 5 is a side elevation of a fly or lure having the latter form of reinforcement applied thereto.

In Figure 4 the shorter end of the blank is bent in an opposite direction to the front end 2 of the same to provide a short flange 6 which, when the device is applied to the body of the lure as shown in Figure 5, forms an abutment for a spiral winding E of silk thread properly treated, or non-corrosive wire surrounding the body of the lure and the reinforcing blank to bind the two together, the said winding also serving to secure side wings F of hair or feathers, or both, as shown, to further enhance the attractive or luring power of the bait, the latter together with the hook being made in the same form and manner as the first described form, and the front end of the blank being applied in the same manner.

Figure 7:
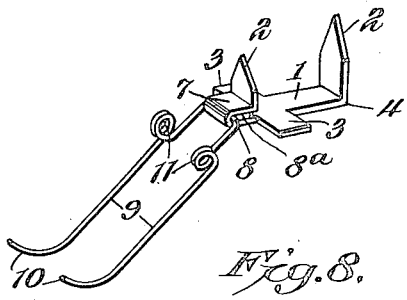
Fig. 7 is a perspective view, similar to Fig. 2, showing the blank bent in a different manner for the attachment of resilient wire weed guards.
Figure 6:
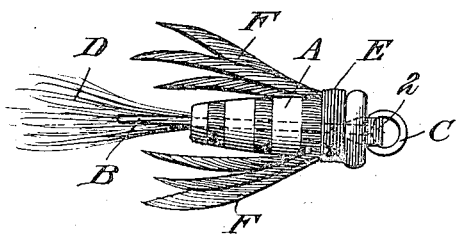
Fig. 6 is a top plan view of the subject matter of Fig. 5.
Figure 8:
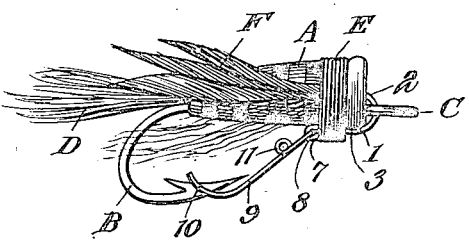
Fig. 8 is a side elevation of a fly or lure having the reinforcing member of Fig. 7 applied thereto and showing the relation of the weed guards to the fish hook.

In Figure 7 there is shown a blank reinforcing member formed as the first described form of the invention, but having its shorter end returned upon itself as at 7, and the upstanding point 2 extending in the same direction as the front point 2. The return bend provides a suitable space or loop for the attachment by soldering, as at 8ª, of the intermediate portion 8 of a bail-shaped member, formed of suitable, small gage, spring wire having its terminal portions 9 extending in parallel relation, in a downwardly direction, with their ends 10 curved and adapted to straddle the point of the hook B and to lie in a substantial horizontal plane therewith, as clearly shown in Figure 8 of the drawing. Each portion 9 constitutes a fender or guard to prevent the point of the hook B from engaging with weeds or projections, such as stones, shells, twigs, etc., and to further enhance their resiliency, each guard is provided with an intermediate coil or two 11 thus allowing the guards to approach the under side of the body of the lure when compressed by the jaws of a fish to permit the point of the hook to function.

From the foregoing it will be seen that a simple and cheaply manufactured reinforcing plate or member for fishing flies or lures has been provided, which may be easily applied to the body of the bait to act in a manner to strengthen the same and to effectively prevent the said body from turning on the shank of the fish hook, and that the same serves to carry the weed guards or fenders in flanking relation to the point of the fish hook to prevent the latter from engaging with weeds or other obstructions beneath the surface of the water.

What is claimed is:—

1. In combination with the body of a fishing fly or lure, having a fish hook extending longitudinally therethrough, with the eye of the hook projecting beyond one end of said body, a plate secured to the underside of the body and having one end passed through said eye and engaged with said body to prevent rotative movement of the shank of the hook in said body.

2. In combination with the body of a fishing fly or lure, having a fish hook extending longitudinally therethrough, with the hook projecting below the body at one end and the eye of the hook extending forwardly from the body at the other end, a plate mounted on the underside of the body and having one end pointed and projecting beyond the body and adapted to be passed through the eye of the hook and have the pointed end embedded in the front end of said body.

3. In combination with the body of a fishing fly or lure, having a fish hook extending longitudinally therethrough, with the eye of the hook projecting beyond one end of the body, a plate mounted on the underside of the body and having one end pointed and adapted to be passed through the eye of the hook and its pointed end embedded in the front end of the body, means for securing the plate to the underside of the body, and a loop provided on the plate for the attachment of a weed guard.

4. In combination with the body of a fishing fly or lure, having a fish hook with its shank passed through said body and the eye of the hook projecting beyond one end of the latter, a plate adapted to be applied to the underside of the body with the front end of the plate projecting beyond the body and passed through the eye of the hook and secured in the front end of the body, the rear end of the plate being provided with a loop for the attachment of a weed guard, and a pointed end provided on the plate adapted to enter the body for securing the plate in position.

5. In combination with the body of a fishing fly or lure having a fish hook with the shank passed through the body and the eye of the hook projecting beyond one end of the body, a plate mounted on the underside of the body and having its front end pointed and adapted to be passed through the eye of the hook and engaged with the front end of the body, laterally extending arms provided on said plate at an intermediate point of its length, the other end of the plate being pointed and adapted to be driven into the body for securing the plate in position.

6. A reinforcing plate for fishing flies or lures comprising an elongated strip of thin flat metal having each end pointed and provided with integral, oppositely disposed arms extending from the side edges of the strip at a point between the ends thereof, said strip being adapted to have one end portion bent and passed through the eye of a fish hook carried by the lure and embedded in the front end of the same to prevent rotative movement of the body of the lure on the shank of the hook, the other end of the strip being bent and embedded in the lure body to reinforce the same.

7. A reinforcing plate for fishing flies or lures comprising an elongated strip of thin flat metal having each end pointed and provided with integral, oppositely disposed arms extending from the side edges of the strip at a point between the ends thereof, said strip being adapted to have one end portion bent and passed through the eye of a fish hook carried by the lure and embedded in the front end of the same to prevent rotative movement of the body of the lure on the shank of the hook, the other end of the strip being bent and embedded in the lure body to reinforce the same, and having a return bend between the second point and the arms, a weed guard or fender mounted in said bend and having downwardly and rearwardly directed legs in flanking relation to the active end of the fish hook, the lower ends of the legs being curved and having intermediate spring coils to enhance their resiliency in order to give under compression to expose the hook and to normally prevent the same from fouling.

In testimony, that I claim the foregoing as my own, I have hereto affixed my signature.

ERNEST HILARY PECKINPAUGH.